United States Patent [19]

Landrum et al.

[11] Patent Number: 5,562,795
[45] Date of Patent: Oct. 8, 1996

[54] HIGH SPEED CARTON FEEDING/HEAT SEALING SYSTEM

[75] Inventors: Charles R. Landrum, Dunwoody; Thomas G. Sanford, Lithonia, both of Ga.

[73] Assignee: Kliklok Corporation, Decatur, Ga.

[21] Appl. No.: 394,535

[22] Filed: Feb. 21, 1995

[51] Int. Cl.$^6$ ............................................. B32B 31/20
[52] U.S. Cl. ................... 156/443; 156/497; 156/498; 156/82; 156/320; 53/373.9; 53/376.7
[58] Field of Search .................... 156/82, 227, 497, 156/320, 322, 498, 443; 53/373.9, 376.7, 375.9, 376.6, 377.8, 373.8; 493/129, 130, 131, 132, 134, 135, 141, 142, 468, 470

[56] References Cited

U.S. PATENT DOCUMENTS

| | | | |
|---|---|---|---|
| 3,207,049 | 9/1965 | Monroe et al. | |
| 3,340,777 | 9/1967 | Hittenberger et al. | |
| 3,562,920 | 2/1969 | Vuilleumier et al. | 34/48 |
| 3,618,480 | 11/1971 | Theys et al. | |
| 3,751,876 | 8/1973 | Oakley et al. | 53/376.7 |
| 3,823,306 | 7/1974 | Davis | 219/366 |
| 4,087,707 | 5/1978 | Shinoda et al. | 310/63 |
| 4,249,978 | 2/1981 | Baker. | |
| 4,776,147 | 10/1988 | Konzal et al. | |
| 4,825,848 | 5/1989 | Macias | 126/299 |
| 4,894,104 | 1/1990 | Hemus | 156/227 X |
| 4,938,410 | 7/1990 | Kondo | 228/180.1 |
| 5,236,408 | 8/1993 | McAdam, III et al. | |

*Primary Examiner*—Michael W. Ball
*Assistant Examiner*—Sam Chuan Yao
*Attorney, Agent, or Firm*—King & Schickli

[57] ABSTRACT

An apparatus for feeding/heat sealing cartons along the feed path of a cartoning line is provided. A conveyor moves the cartons past the heat sealing station where an elongated nozzle assembly forms a heated air stream directed against the carton flap and the side of the carton to activate the coating to form an adhesive. A bypass valve and duct is provided to interrupt the flow of heated air in the event that the carton does not clear the activation zone in a predetermined time. Strategically placed heat shields and coolant passages are provided to further isolate the conveyor from the heat. The nozzle includes a slotted outlet with an elongated bar closely spaced above to deflect the heated air stream when a carton is present for adhesive activation; said bar having a tapered fin to form a modified air foil along the trailing edge to divide, recombine and compact the stream when a carton is not present. The upper feed belts of the conveyor are adjustable to adapt to cartons of various heights.

10 Claims, 5 Drawing Sheets

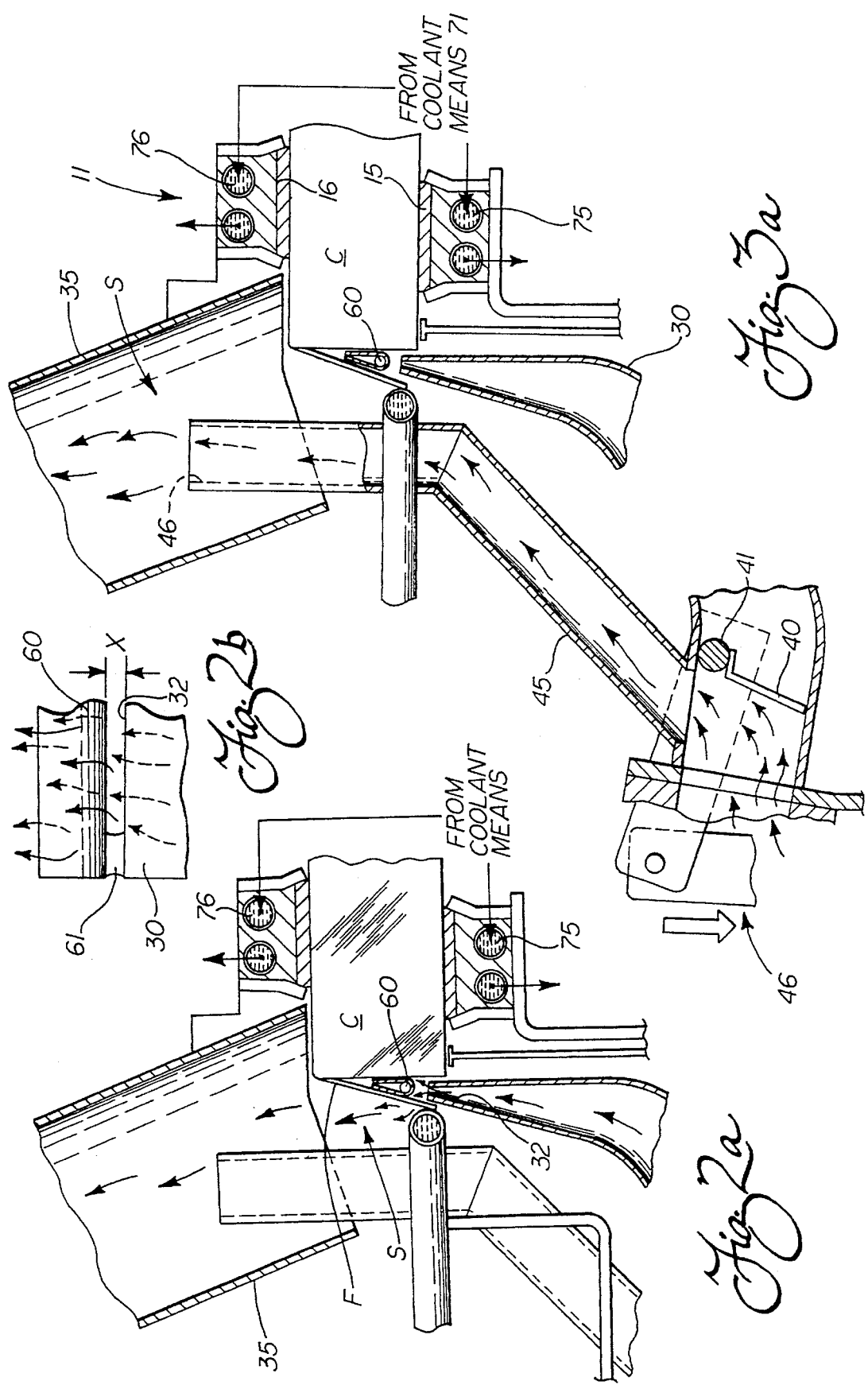

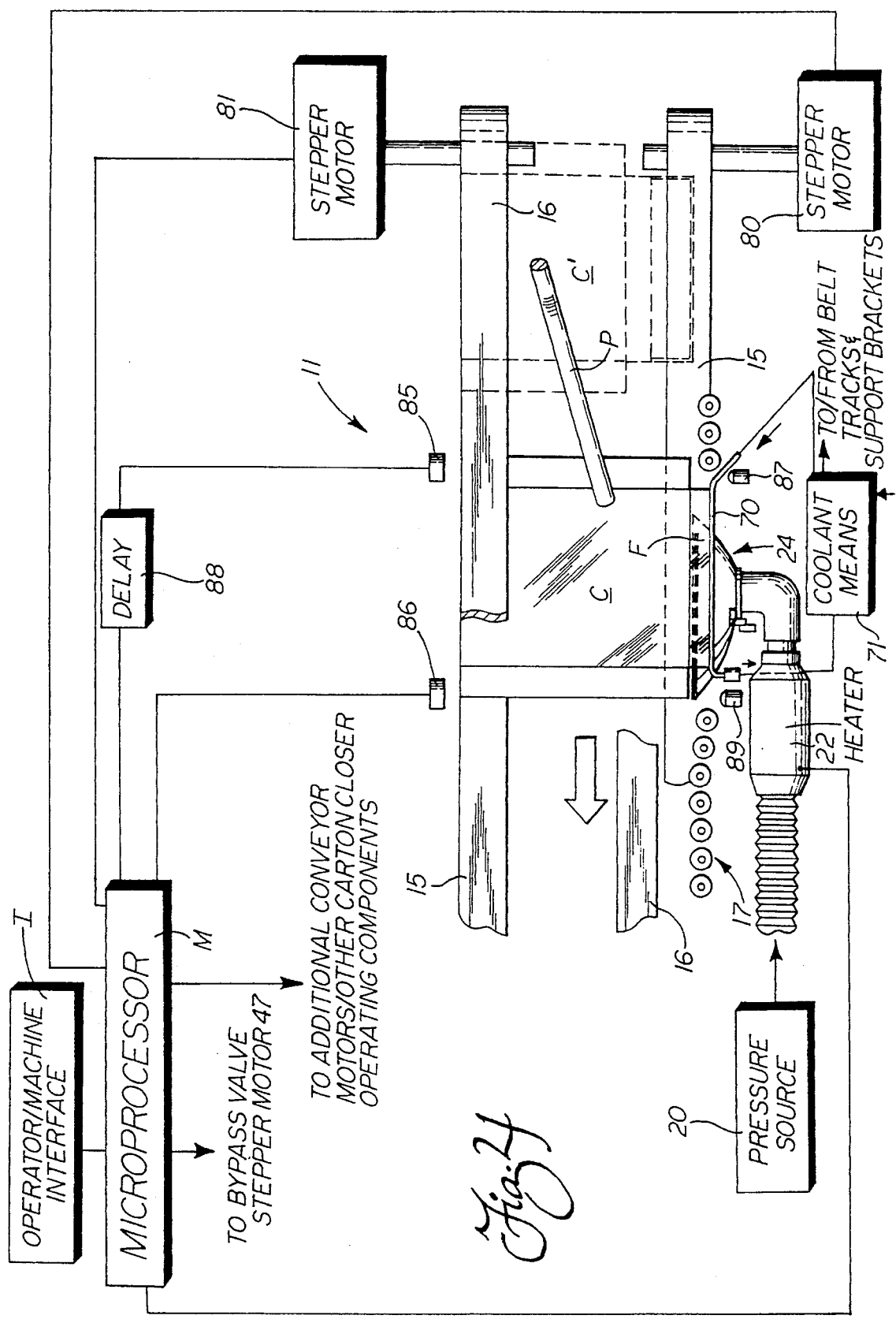

HIGH SPEED CARTON FEEDING/HEAT SEALING SYSTEM

BACKGROUND OF THE INVENTION

The present invention relates generally to paperboard carton handling and, more particularly, to an apparatus/method for feeding and heat sealing cartons by activation of a coating on the carton to form an adhesive.

It has been known for many years to form paperboard cartons or boxes on a forming machine including a plunger and die arrangement at a first station, fill the carton at a second station through its open top and then close and seal the carton as the cartons are being transported along a series of conveyors. For many years, the most successful approach to sealing of the cartons for closing required a four step process of preheating of the carton and the closing flap by a radiant heater, application of a liquid adhesive to the carton/flap, conversion of the adhesive to establish a high tackiness and then applying pressure between the flap and the carton for the final sealing/closing. It will be apparent that having to carry out three separate and extended operations including heating by radiation prior to the final sealing/closing step, greatly increases the length and cost of the cartoning line, as well as the operating cost including a high electrical power requirement. In addition, this prior technology severely limits the speed by which the cartons could be processed on the cartoning line.

While this prior art process worked reasonably well, it was also limited in its use with prior art conveyors having lugs or flights that are mounted on drive chains engaging the cartons from below and pushing along the rear edge. A good example of one of the most successful cartoning machines and methods utilizing this approach is described and claimed in the U.S. Patent to Gobalet U.S. Pat. No. 2,984,598, owned by the assignee of the present invention. This particular prior art patent illustrates the carton machine/method as it applies to a Charlotte type carton and describes a typical sequence of sealing and closing wherein the front flap is first sealed, and then the two side flaps are sealed in the same manner at a downstream position. Between the two sealing positions, the carton is rotated through 90°, as is known in the art.

Over the years, improvements have been made to improve on the Gobalet invention, and in particular to reduce the number of steps required and the length of the machine prior to pressing the flap(s) against the carton. As modern thermoplastic coated paperboard cartons became available, success in sealing and/or carton closing could be accomplished by combining air with the heat source for introduction within the inverted V formed by the flap and the carton during continuous movement along the line. It was found that success could be gained by blowing opposed, high velocity streams of heated air to convert the thermoplastic film to a tacky state to form the adhesive, rather than relying on the relatively slow radiation heat approach. It was discovered that the plastic coating on the carton/flap could be heated more quickly, and the overall speed of the cartoning line could thus be increased. Also, since the paperboard and its coating had been improved, the number of steps prior to applying pressure to seal and close the carton, especially with regard to preheating, could be reduced. A leader in this technology at the time is represented by the Hittenberger et al. U.S. Pat. No. 3,340,777, also owned by the present assignee. In this regard, the hot air nozzle resembled a two sided curved blade and with orifices on both sides to direct a plurality of hot air streams against the carton body and the flap, as the inverted V formed by the flap and the carton moved over the nozzle.

Later, as the technology of the coated paperboard cartons advanced further, and especially with regard to providing a carton that could be heated in the oven, further changes were made. During this era, it became common place to have the carton coated with a thermosetting resin, to allow reheating by the consumer. To obtain high speed, reliable sealing/closing, a quick drying adhesive was sprayed on the carton/flap in order to provide a rapid bonding, and thus hold the flap against the carton during the extended time that it takes for the activated thermosetting adhesive to fully bond. When this innovation came along, the same general approach to the use of a nozzle with a tapered cross section to fit within the inverted V was retained. The heat activating air streams for pre-drying the sprayed on adhesive, as well as activating the thermosetting adhesive remained basically the same. This improvement approach is shown in the Baker U.S. Pat. No. 4,249,978, and is also owned by the present assignee.

During the two decades of development represented by these prior art patents, the speed of operation, including the carton feeding and heat sealing/closing, gradually increased. However, by today's standards, the cartons were still being fed at a relatively low speed by the lugged chains running along the base of the conveyor. Given those prior art speed conditions, it was not exceedingly difficult to activate the film to form an adhesive, since the carton closer system was severely limited in speed by the turning operation on the lugged conveyors. The relatively slow speed meant that each carton/flap was simply retained in the adhesive activation zone long enough for the desired softening effect of the film or coating to provide a reliable seal.

Until just recently, the heated air nozzles illustrated in the '777 and the '978 patent had the capability of supplying sufficient heated air given the residence time of the carton within the activation zone position. In fact, before the lugless closing concept arrived on the scene, the specific approach in these two patents was generally recognized in the industry as being better than any other known methods. However, with the lugless closer technology came the need for the speed of the adhesive application portion of the operation to be increased.

It has been found in fact that it was no longer possible to obtain the type of adhesive activation of a pre-applied coating/film that is necessary for reliable sealing in a lugless closer system. The dwell or residence time was simply too short to successfully accomplish a reliable seal. Thus, in the recent past with the advent of the lugless closers, the systems were limited to the use of separately applied glue, such as by hot melt glue applicators. But, with the use of these glue applicators, a customer could still not take full advantage of the increased speed. Also, the added initial cost the cost of the glue supply and the maintenance of the system is very significant. Furthermore, some customers simply prefer cartons sealed by hot air activated adhesive from the coating/film of the carton.

Also, during this prior two decade development of the technology of hot air heat sealing, the accepted practice for stopping the heated air from being introduced along the feed path during the time when the feed of the cartons was interrupted, was to simply pivot the entire heater and nozzle assembly downwardly below the conveyor. In this manner, the nozzle was moved away from the carton flow; that is, specifically removed from the inverted V between the carton and the flap being sealed. While this prevented the carton from being heated to the point of reaching its ignition point, the heated air streams from the two sides of the nozzle continued to heat the underside of the conveyor.

By radiation, conduction, and especially by convection, as the heated air was prone to move through and up along the conveyor parts, substantial conveyor damage resulted in many cases. As a consequence, except for very short interruptions in the flow of cartons, the heating elements also had to be turned off. Even so, over time, this heating of the conveyor by residual or unwanted heat provided significant deterioration of the belts and rollers (usually plastic), a breakdown of lubricants, and even damage to sensitive adjacent electronic components. Thus, apart from not being able to find a way to supply the high volume of heated air to provide the necessary adhesive activation during the short residence time of the carton in the activation zone along a high speed cartoning line, the engineers found the problem of excessive heating of the conveyor to also be insurmountable. The continuous discharge of the high volumes of high temperature air between cartons, and especially discharge under the conveyor during these and longer periods of interruption of the carton feed, made the prior systems undesirable given the need to maintain proper conveyor integrity.

Also, due to the requirement for turning the heating elements on and off, and particularly due to the impact of the heaters as they are rapidly retracted from the feed path, greatly reduces the expected life of the delicate electric coil heating elements. In addition of course, if the heating elements have to be turned off and then back on, valuable time is lost waiting for the required temperature to be reached again and stabilized.

Accordingly, an important need is identified for taking the next step in the development of carton heat sealing/closing systems. Of particular importance is a need for improving the activation of the modern thermoplastic coating/film on cartons at a speed commensurate with the advances that have been made in other areas along the cartoning line. Of particular interest in this respect is the improvement in the speed of a related carton feeding and turning apparatus and method set forth in the co-pending U.S. Patent application, Landrum et al., Ser. No. 08/372,536, filed Jan. 13, 1995 and also owned by the assignee of the present invention. In this prior application, I, and the other inventors, have illustrated and claimed a successful lugless carton feeding/turning operation that is capable of handling cartons up to the speed of 200 cartons per minute, while at the same time maintaining the desired simplicity of the machine. The need thus applies not only to matching of the speed of this lugless turning concept, but also to provide a superior heat seal in the process, and at a significant savings in time and in the initial cost of the machine. As will be apparent, this need further calls for an advancement to deal with the substantial additional heat capacity needed to activate the adhesive in the shortened residence time in the activation zone, and at the same time to eliminate any build-up of heat along the conveyor.

SUMMARY OF THE INVENTION

Accordingly, it is a primary object of the present invention to provide a carton feeding and heat sealing apparatus and related method to be used in a cartoning line, so as to overcome the identified shortcomings of the prior art.

It is another object of the present invention to provide a feeding/sealing apparatus and method wherein a heated air stream is provided in a unique manner for activating the adhesive coating along a carton feed path, and then capturing either the dispersed heated air stream after activation, or a compacted air stream in the absence of a carton, so as to prevent excessive heating of the conveyor.

It is another object of the present invention to provide a feeding and heat sealing apparatus and method for closing of a carton at high speed in a lugless closer system by activation of the coating/film on the carton in a rapid and more efficient manner than heretofore attained.

It is still another object with respect to the feeding/heat sealing/closing apparatus and method of the present invention, to provide a system that relies upon delivery of a high temperature, high velocity air stream for meeting the requirements of high speed carton closing, and at the same time protecting the integrity of the carton and the conveyor by capturing and removing the residual heated air.

Another and related object of the present invention is to provide the apparatus and method for feeding and closing cartons by heat sealing that not only captures the excess or residual heated air after activation of the adhesive, but also provides for having the heated air stream bypass the carton/conveyor in the event that the predetermined residence time of the carton in the adhesive activation zone is exceeded.

It is another object of the present invention to provide a nozzle assembly for mounting on a conveyor or the like for heat sealing of cartons and having a nozzle outlet and a modified air foil shaped bar serving to intercept and control the stream in the most efficient manner possible, during either the time when a carton is present for adhesive activation, or when a carton is not present.

It is still another object of the present invention to provide an apparatus/method for adhesive activation for coated paperboard cartons that is computer controlled and programmable so as to balance all of the parameters of the heat sealing operation, thereby to maintain the optimum sealing of the carton, as well as for protecting the conveyor and the carton from excessive heating.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purpose of the present invention as described herein, an improved apparatus is provided for feeding and heat sealing successive cartons along a cartoning line. In the preferred embodiment illustrated, a Charlotte type carton is being sealed along its front flap; it being understood that the side flaps are sealed in the same manner downstream after turning the carton through 90°. As will be clear, the turning of the cartons is to be carried out in any known manner, but preferably by a lugless turning arrangement, such as illustrated and claimed in our prior patent application, Ser. No. 08/372,536, as mentioned above and which is incorporated herein by reference. In accordance with this particular carton handling operation, the feeding/sealing and closing occurs along a conveyor defining a substantially horizontal carton feed path. While sealing/closing of the Charlotte type carton is illustrated and described in detail herein, it will be apparent that the principles of the present invention as broadly interpreted can be used in other appropriate carton sealing environments.

The cartons that are being sealed in accordance with the present invention are coated with a thermoplastic resin, such as a polyethylene film and/or a thermosetting resin, such as a polyester film. It is also to be understood that the invention applies specifically to heat sealing utilizing the film by itself, or in a situation where an additional sprayed on water-based or similar adhesive may be desirable to be in combination therewith, such as disclosed and claimed in the '978 patent, referenced above.

In accordance with the invention, heated air is generated and supplied to an elongated nozzle assembly positioned along one side of the conveyor feed path with the elongated outlet directing a heated air stream against the carton/flap for activating the coating/film to form the adhesive. In accordance with an important aspect of the present invention, an exhaust duct is positioned above the nozzle to capture the heated air, either after being deflected and dispersed by engagement with the carton, or in a compacted stream form in the absence of a carton. In this manner, excessive heating of the conveyor during the feeding of the cartons and the heat sealing operation is advantageously avoided.

In accordance with another important concept of the present invention, the nozzle assembly includes an integral bypass valve and a bypass duct for interrupting the flow of the heated air, such as when a carton stalls in the activation zone. When the bypass valve is actuated to interrupt the flow, the bypass duct is simultaneously opened for receiving the heated air stream and directing it away from the carton and the conveyor for further protection. Preferably, the bypass duct directs the heated air into the confined space defined by the entrance to the exhaust duct for capture and delivery to the remote location.

In order to further enhance the feeding/heat sealing system of the present invention, an exhaust fan is provided on the exhaust duct to positively pull the heated air away from the conveyor. Preferably, the exhaust fan operates at a capacity ratio with respect to the heated air nozzle of approximately 6:1. In this manner, the boundary layer of the air entering the exhaust duct entrains a substantial volume of ambient air to provide an additional cooling effect of the conveyor at this position and to reduce the temperature of the exhaust air to about 93° C. (200° F.).

In accordance with the teachings of the preferred embodiment, the air is heated in an electrical heater to approximately 620° C. (1150° F.) and the cartons are moved at a speed within the range of 150 cartons per minute to 200 cartons per minute. The volume of the heated air stream is controlled to provide just the right amount of softening of the coating/film for efficient sealing.

As the heated air is directed at high velocity and high temperature into the inverted V formed by the inside of the flap and the side of the carton, the air stream is deflected and split into two opposed streams that then impinge both coated surfaces. After softening the coating along the lines defined by the split stream to thus form the adhesive, the application of pressure downstream between the flap and the carton forms a highly efficient and reliable seal, and the carton is successfully closed.

The speed of the conveyor, the temperature of the heated air stream and all other parameters are computer controlled in accordance with the present invention. Different profiles are programmed into the computer circuit, including a microprocessor, such as an IBM compatible PC 286 or higher. A selected profile matches the particular coating on the carton, as well as the speed of the cartoning line and other variables, such as the ambient conditions surrounding the line.

For a coating of polyethylene film, a carton/flap surface temperature of approximately 150° C.–290° C. is required; whereas, with a polyester film, a surface temperature of approximately twice this level is required. As the heat requirements increase, the residence time of the carton within the adhesive activation zone can be extended, such as increasing the length of the nozzle or by slowing of the conveyor. On the other hand, as the temperature decreases, a shorter nozzle is suitable and the conveyor can be operated at an increased speed, thus providing decreased residence time for exposure of the carton/flap to the heated air stream.

Preferably, the bypass valve is mounted within an enlarged portion of the mouth of the nozzle. The nozzle is tapered to a relatively narrow outlet providing the heated air stream at a relatively high velocity to more efficiently impinge against the carton/flap surfaces for sealing.

The nozzle includes an elongated bar closely spaced above the slotted outlet. The width or thickness of the bar is substantially the same as the inverted V-shaped space between the inside of the flap and the carton. In this manner, the bar forms a dam to deflect and split the heated air stream to cause the impingement against the carton/flap for efficient adhesive activation. The adhesive is confined along opposed lines, as thus defined along the carton/flap adjacent the upstream side of the dam.

The bar is also formed as a modified air foil cross section with a curved leading edge and a tapered fin along the trailing edge. When a carton is not present, the stream is divided by the air foil with the two halves moving smoothly around the bar. Advantageously, the boundary layer effect along the tapered fin serves to recombine the stream into a compact or focused cross section to assist in directing the heated air into the exhaust duct. This action is operative to efficiently capture the excess heated air ejected as a free stream from the nozzle between cartons during continuous carton feed along the feed path, or any other time when there are no cartons present.

In order to further guard against excessive heating of the conveyor, various passive heat shields, as well as active heat sinks are provided. For example, a reflector plate is mounted on the conveyor opposite the back of the curved nozzle so that radiated heat will be directed out and away from the conveyor structure. Cooling passages are provided in the flap guide or hold down tubing, the nozzle mounting bracket, the exhaust duct and the upper conveyor belt bracket, as well as in the tracks for both the upper and lower conveyor belts. Coolant means, such as a cooled water circuit, provides for the proper amount of cooling to further avoid the deleterious effects of heat build up around the conveyor. The bracket for the heat duct/upper conveyor belt adjacent the side of the carton being sealed, is adjustable so that cartons of different height can be accommodated.

With particular attention to the structure of the nozzle assembly of the present invention, the body of the nozzle is tapered from its inlet mouth to an elongated outlet that extends along the feed path. As indicated above, the elongated bar is closely spaced above the slotted outlet and serves to deflect the stream for impingement in a unique manner when a carton is present. A higher velocity and more efficient stream in terms of activating the adhesive is provided as opposed to the prior double faced blade type nozzles of the prior art. Of significant importance is the fact that when a carton is not present, such as in the gap between cartons as they are fed along the feed path, the bar is shaped so as to be operative to compact the stream, that is to form a single vertical air stream. This allows the stream to be more easily captured and directed away from the conveyor. To perform this function most efficiently, the curved leading edge smoothly divides the stream and a tapered fin along the trailing edge then compacts the stream by the air foil effect.

Also, the bypass valve is advantageously positioned within an enlarged portion of the mouth and the bypass duct is an integral part of the nozzle assembly to provide the best performance, as well as the lowest overall cost of fabrication.

In an exemplary embodiment for sealing Charlotte type carton flaps, a nozzle with an 8 inch long slotted outlet is provided with an approximate 0.080 inch width. Suitable bridge means are provided at the ends of the nozzle to space the bar at an optimum distance from the outlet of approximately 0.075–0.100 inch. With this arrangement, the stream is tightly focused along opposed lines during deflection for adhesive activation, that is, when the carton/flap is present. At the same time the stream is tightly focused and compacted in an efficient manner when the carton/flap is not present. A wide range of cartons, including those of 4 inches to 12 inches in length along any side can be successfully closed with this nozzle.

In accordance with the related method of feeding and heat sealing cartons, the present invention contemplates the steps of feeding the cartons at a substantially constant speed, generating a supply of heated air, directing a heated air stream from the supply to impinge on the carton to activate the adhesive coating, and then capturing the dispersed heated air in a confined space for directing to a remote location.

These steps as well as all of the other parameters of the operation are computer controlled for each size carton for optimum efficiency and effectiveness. As a result, during operation, not only is an improved seal formed between the carton and the flap, but also the practice of the method prevents excessive heating of the conveyor, and thus avoids damage to the belts, rollers and other plastic components, the lubricant of the moving parts and the electrical components.

Further in accordance with the method, a computer programmed, predetermined residence time is established for the heated air stream to impinge on the carton. Photocells or other sensors are provided along the feed path to sense the entry of the carton into the adhesive activation zone, as well as the carton's exit from the activation zone. In any circumstance when the carton is moving too slow, stalls, or otherwise does not clear the zone within the predetermined time, the microprocessor of the present invention actuates the bypass valve to interrupt the air stream, and simultaneously bypasses the stream around the carton and the conveyor to the remote location.

Also in accordance with a key method aspect of the present invention, a vacuum is created in the confined space above the nozzle and a high volume exhaust flow channel is provided for the most efficient capturing and disposal of the dispersed air stream after the adhesive on the carton/flap is activated. Preferably, when the air stream is bypassed, it is also directed into the space for exhausting along the same exhaust flow channel to the remote location.

In order to provide maximum protection, the method contemplates providing an air volume to create the vacuum that is approximately six times the volume of the heated air stream from the nozzle. This assures that relatively large quantities of ambient air are drawn in and mixed with the heated air within the adhesive activation zone along the feed path. Furthermore, as indicated above when a carton is not in the zone, a significant advantage is gained by the method as a result of intercepting and dividing the heated air stream, such as by the modified air foil shaped bar, which in turn creates low pressure boundary layers to recombine and compact the stream. This allows capture of substantially the entire heated air stream in the confined space for disposal.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 2a is an enlarged partial cross section focusing on the hot air stream being deflected so as to activate the adhesive on the carton as the carton flap is held to form an inverted V;

FIG. 2b is an enlarged and cut away showing of one end of the nozzle adjacent the outlet and illustrating at one end a support bridge for the bar controlling the air stream;

FIG. 3a is a partial cross sectional view similar to FIG. 3, and enlarged to show more detail, specifically with regard to interruption of the flow to the nozzle and bypass of the heated air stream to avoid contact with a stalled carton; and FIG. 4 is a schematic diagram illustrating the control circuit of the present invention including the interconnection of the operating components with the microprocessor of the circuit.

Reference will now be made in detail to the present preferred embodiment of the invention, an example of which is illustrated in the accompanying drawings.

DETAILED DESCRIPTION OF THE PREFERRED EMBODIMENT

Figure 1:
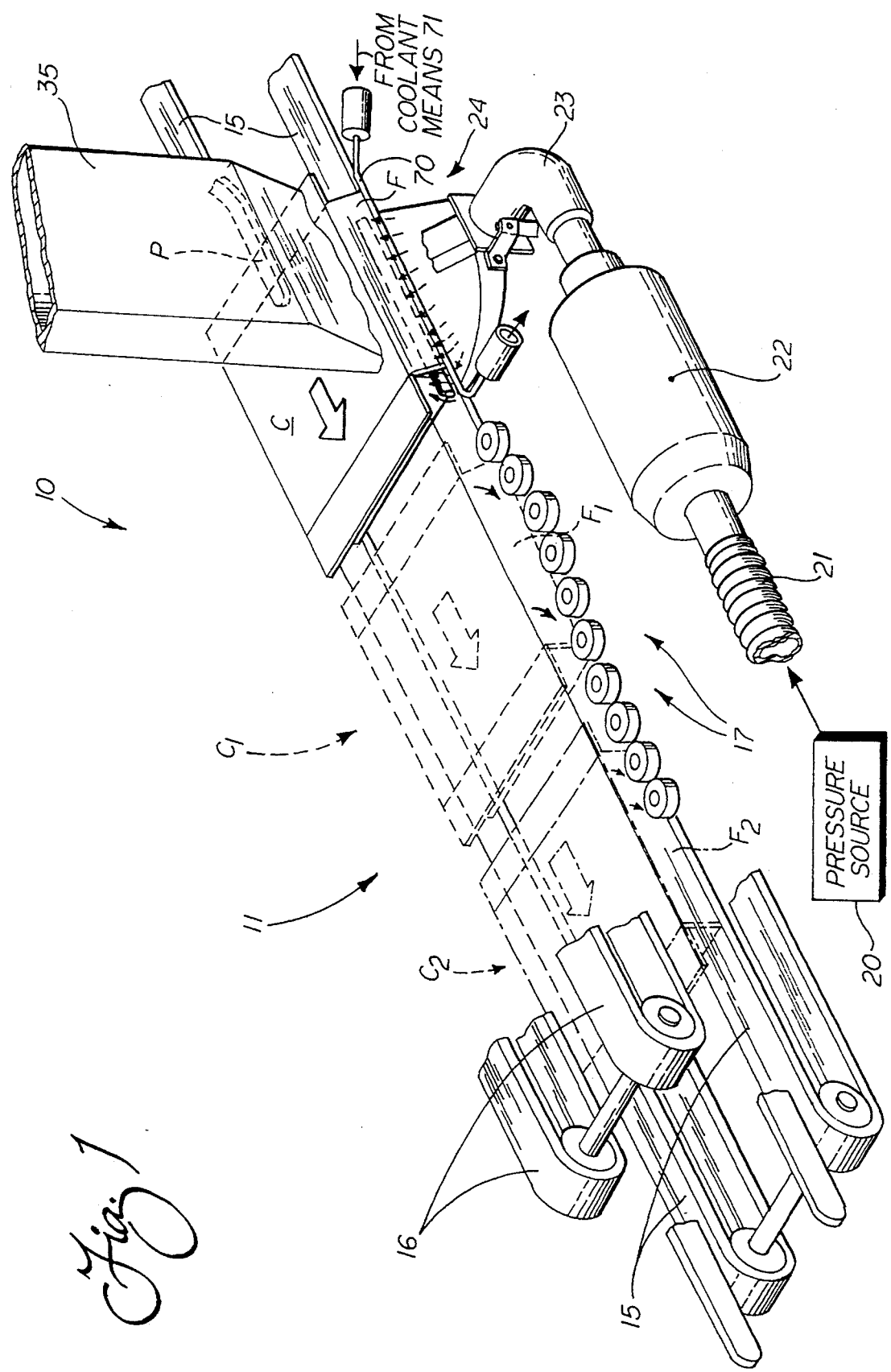
FIG. 1 is an overall perspective view of the carton feeding/heat sealing and closing system for paperboard cartons laid out in accordance with the preferred embodiment of the present invention; it being understood that parts are broken away for clarity.

With reference specifically now to the overall view of FIG. 1, a more detailed and comprehensive review of a feeding/heat sealing system 10 operating on successive cartons C can be seen. As illustrated, the cartons C, $C_1$ and $C_2$ are positioned along a conveyor, generally designated by the reference numeral 11. Each of the cartons C, $C_1$, $C_2$ are preferably Charlotte type cartons with a corresponding front flap F, $F_1$ and $F_2$, respectively. As is known in the art, the cartons are provided with a coating or film of thermoplastic and/or thermosetting resin, which when heat activated forms an adhesive for sealing of the flaps to the respective cartons. As illustrated in FIG. 1, the heat is applied along the adhesive activation zone illustrated by the carton C; the next carton $C_1$ represents the folding/hold down zone for the flap $F_1$ and finally the carton/flap pressure zone is represented by the carton $C_2$ where the flap $F_2$ is completely folded over and bonded to the carton. Immediately downstream of the conveyor 11 is the transitional conveyor for lugless turning of the cartons in sequence. The lugless turning is as set forth in the previous pending application '536, as identified above.

The conveyor 11 within the broader aspects of the present invention can take the form of various formats; however, in the preferred embodiment illustrated and for a format suitable for mating with the lugless closer system of the prior application, the conveyor comprises a pair of lower feed belts 15, a pair of upper feed belts 16 and a plurality or gang of fold down/pressure rollers along the side of the feed path defined by the belts 15, 16; the rollers being designated generally by the reference numeral 17.

In order to generate the heated air to form the hot air stream needed for activation of the coating/film on the cartons, an air pressure source 20 supplies a suitable flow of air through air supply line 21 and into a standard, high capacity electrical heater 22. For purposes of illustrating the preferred embodiment, the heater 22 is selected as a ten thousand watt unit; such as manufactured by Osram/Sylvania of Exeter, N.H., USA. Once the air is heated, it travels through transfer tube 23 and then into an elongated nozzle assembly, generally designed by the reference numeral 24. As illustrated in FIG. 1, represented by the small flow arrows, it is operative to blow a heated air stream at high velocity between the front flap F and the carton C, as the carton is being moved at a substantially constant speed along the lower feed belts 15, and as assisted by the upper feed belts 16. Just prior to entering the adhesive activation zone, as represented by carton C' in FIG. 4, the cover of the carton C is folded downwardly, into the position shown, by a plow P.

Figure 2:
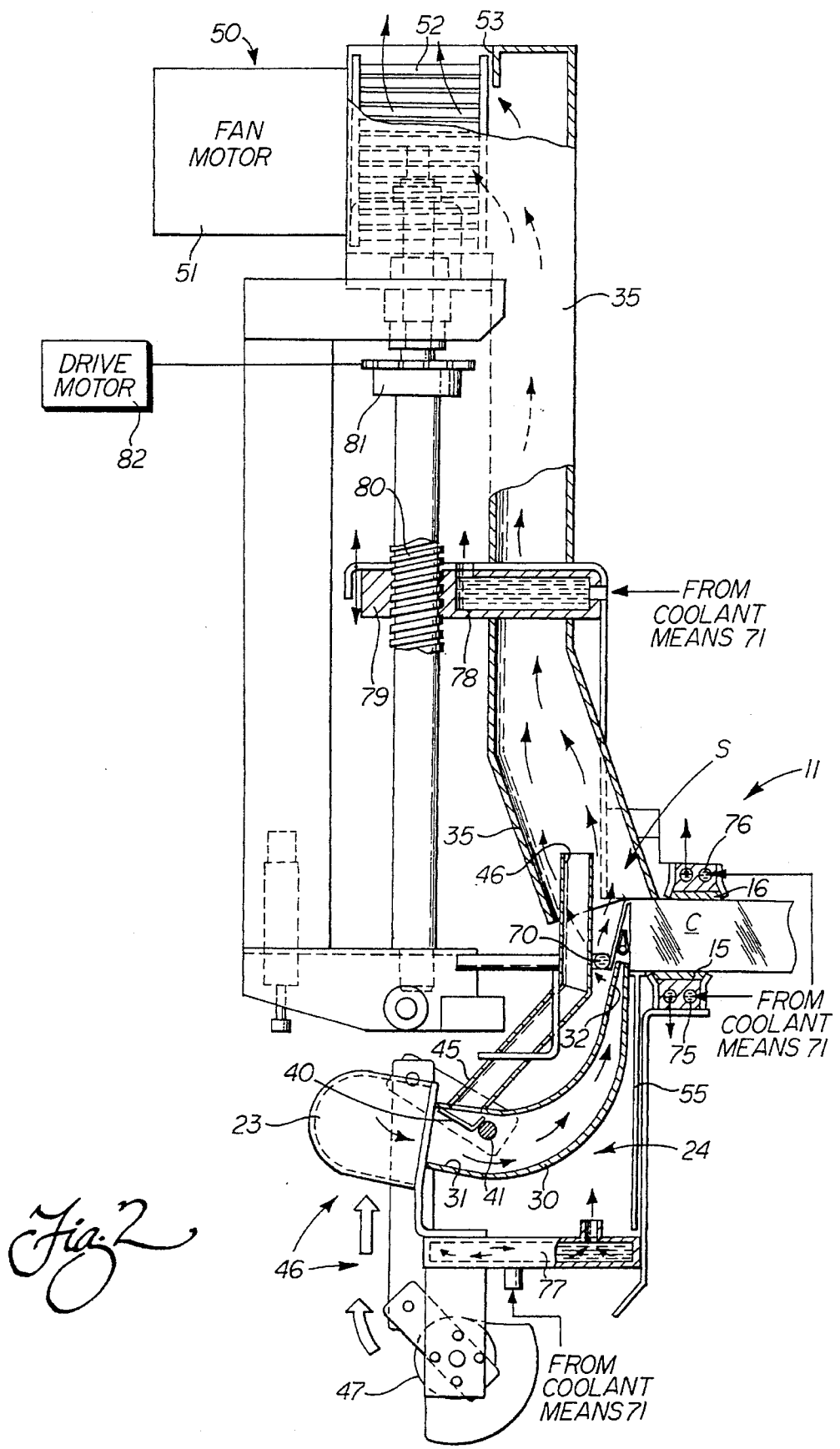
FIG. 2 is a cross sectional view taken through the nozzle assembly for providing the heated air stream to the carton, and by the flow arrows illustrating the heat activation of adhesive.
Figure 3:
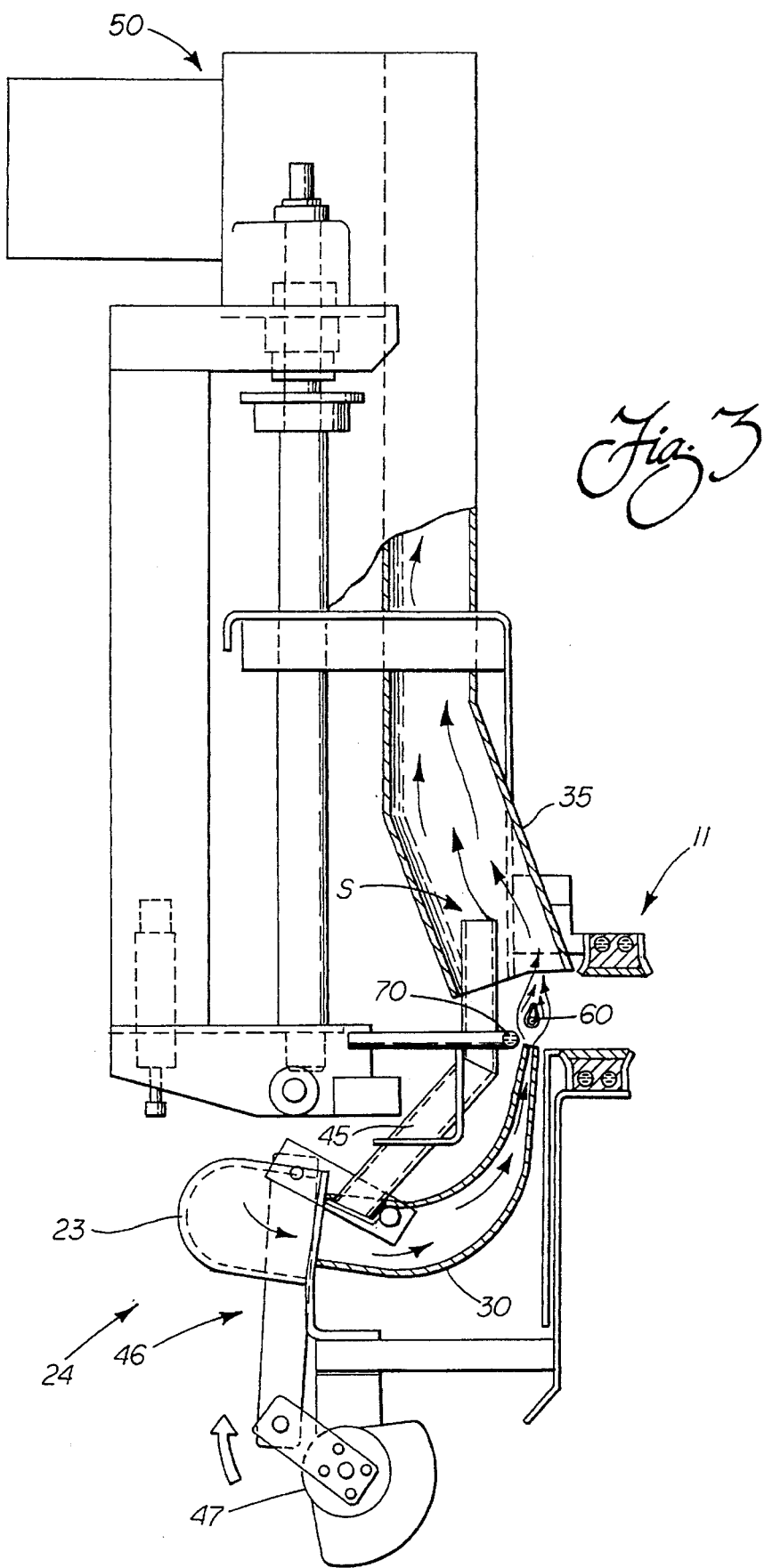
FIG. 3 is a cross section view similar to FIG. 2 but with less detail and illustrating the manner in which the heated air stream is divided, recombined and compacted for entry into the exhaust duct.

As best illustrated in FIGS. 2 and 3, the nozzle assembly 24 includes a nozzle body 30 having an enlarged inlet mouth 31. As shown in this figure, as well as in the related enlarged FIG. 2a, the distal end of the nozzle body is formed as an elongated outlet 32, so as to form an open discharge slot that extends longitudinally along one side of the conveyor feed path. The slotted outlet 32 is directed upwardly toward the carton C, and specifically into the inverted V formed between the inside of the flap F and the side of the carton C. As will be apparent from the flow arrows in FIGS. 2 and 2a, a high velocity heated air stream is provided for activating the adhesive coating, whereupon at the downstream zones represented by the cartons $C_1$, $C_2$, the corresponding flaps $F_1$, $F_2$ can be folded over and efficiently and effectively sealed to close each successive carton along the cartoning line.

Once the heated air stream has softened the carton coating, the stream is dispersed and moves upwardly into a confined space S, as defined by the entrance to an exhaust duct 35; compare FIGS. 2 and 2a.

Further in accordance with the invention and with reference now to FIG. 3, once the carton C clears the adhesive activation zone the heated air can continue to flow through the nozzle body 30, and directly into the exhaust duct 35 in a compacted or confined stream, as will be explained further in detail below. The flow of the heated air stream directly into the duct 35 occurs not only during the time when there is a gap between the cartons C, $C_1$, $C_2$, but otherwise when the flow of the cartons is interrupted, such as during start up or shut down of the system 10. In any case, it will now be recognized that both during the operational mode when cartons C, $C_1$, and $C_2$ are being sealed and closed, as well as at other times, excessive heating of the conveyor 11 is avoided due to the capture of substantially all of the heated air stream, either in the dispersed or non-dispersed form. The heated air is sent directly up the duct 35 for disposal at a remote position.

Whereas the prior art systems require pivoting of the entire integral heater/nozzle, as illustrated in the '777 patent, in accordance with the present invention the flow of the heated air can be maintained without bodily movement. There is no problem of release of heated air below the conveyor 11, as has been the primary problem in the past and in addition, since the heater 22 remains stationary, there is no tendency for the delicate electric heating elements to break.

As best illustrated in FIGS. 2 and 3, the nozzle assembly 24 also includes a bypass valve, which in the embodiment shown takes the form of a flapper or gate 40 that is pivoted for movement on shaft 41 within the enlarged portion of the mouth 31 of the nozzle body 30. As illustrated in both FIGS. 2 and 3, the flapper 40 is normally in a position to allow the heated air stream to move freely up through the nozzle body 30 and out of the slotted outlet 32, as described above. Formed integrally with the nozzle body 30 and extending at an angle from the enlarged portion of the mouth 31 is a bypass duct 45. Of course, when the flapper 40 is in the position to allow flow upwardly through the nozzle body 30, the bypass duct 45 is closed to flow (see both FIGS. 2 and 3).

The bypass valve, namely the flapper 40, can be actuated by any suitable means, such as shown in the preferred embodiment by a three link system, generally designated by the reference numeral 46, and a stepper motor 47. In operation to thus move the flapper 40 from the normal flow position of FIGS. 2 and 3 to the bypass position of FIG. 3a, the stepper motor 47 shifts the link system downwardly, as shown by the action arrow in FIG. 3a. As will be apparent from viewing this figure, the flow along the nozzle body 30 is interrupted as the linkage system is actuated, and simultaneously the flow is established along the bypass duct 45 as it is opened. Thus, the heated air stream is now directed away from the carton C and from the conveyor 11 and being released directly within the confined space S provided by the exhaust duct 35. As indicated above, this mode of operation occurs when the carton C within the adhesive activation zone does not properly clear the zone within the predetermined time programmed into the computer circuit. This can occur in the simple instance where a carton C may stall in the activation zone, or simply due to the carton moving too slow for whatever reason. In either case, the carton C is protected from excessive heating, and of course heating the paperboard material to the point of ignition is avoided. Since exit orifice 46 of the bypass duct 45 extends well up into the exhaust duct 35 the chances of heated air feeding in a retro fashion back toward the carton C is also eliminated.

In order to further eliminate the deleterious heating of the carton C and the conveyor 11, the exhaust duct 35 is provided with an exhaust fan, generally designated by the reference numeral 50. A motor 51 drives a suitable squirrel cage blower 52 positioned in exit opening 53 of the duct 35. During operation, the fan 50 provides a positive pull of the heated air from and around the nozzle assembly 24, as well as through the bypass duct 45. In this manner, excessive heat build up is advantageously avoided by scavenging of all of the heated air and discharging it through the remote exit opening 53 spaced well away from the conveyor 11 (see FIG. 2). As a consequence, the components of the conveyor 11, including the belts 15, 16, which are normally made of polyurethane plastic, the rollers 17 also formed of polyethylene plastic, the lubrication points of the moving parts of the conveyor 11, as well as all electrical components are protected.

As shown in FIG. 2, the nozzle body 30 is tapered and is curved through approximately 90° from the mouth inlet 31 to the slotted outlet 32. Positioned behind the body 30 is a heat reflecting shield 55 to minimize the transfer of heat toward the conveyor 11 by radiation. Other similar shields can be provided to further carry out the objective of minimizing heat transfer to the conveyor. Additional shields along the sides of the curved nozzle body 30 (not shown) can be added for example.

As the carton C enters the adhesive activation zone, and the cover is plowed down into position by the plow P, the flap F is positioned by a means to form a specific acute angle with the side of the carton, as illustrated. Preferably, this means for positioning includes an elongated bar 60 fitting closely within the inverted V between the flap F and the carton C (see FIGS. 2a, 3a). In this manner, the bar 60 forms a dam to deflect the heated air stream to provide a highly efficient adhesive activation on the upstream side of the dam. In effect, the heated air stream is deflected and impinges against the flap F and the carton C, thus forming a pair of lines extending longitudinally along the lower portion of the flap F/carton C.

As indicated above, in the preferred embodiment, the slotted outlet 32 of the nozzle body 30 is approximately 0.080 inch wide and is approximately 8 inches long. At each end of the nozzle body 30 adjacent the outlet 32 (see FIG. 2b), a bridge 61 is operative to provide an air gap space x of approximately 0.090 inch. With this preferred construction, the standard range of cartons from 4 inches–12 inches long can be heat sealed at high speed in a highly efficient manner.

In accordance with an additional key aspect of the present invention, and described generally above with regard to FIG. 3 of the drawings, the trailing edge of the bar 60 is formed by a tapered fin giving the overall bar the shape of a modified air foil in cross section. While the curved leading edge is operative to deflect the heated air stream for heat activation in the presence of the carton C (see FIG. 2a), in the operational mode where no carton is present the bar 60 advantageously assumes a totally different mode of operation. In FIG. 2b, the controlled nature of the flow of the air from the slotted outlet 32 up and around both sides of the bar 60 when no carton is present can be seen. It serves to smoothly divide, recombine and compact the stream by the air foil effect generated by the boundary layer along its two sides (see again FIGS. 2b and 3). In this manner, the heated stream can be more easily controlled and thus captured within the space S provided by the mouth of the duct 35. The efficient capture and disposal of a substantial volume of unwanted heat that would otherwise be trapped within the conveyor 11 is assured by this design of the bar 60.

To accomplish still a further objective of the present invention, the positioning means for the flap F also includes a folding/hold down tubing 70 extending substantially parallel to the bar 60 and along the outside of the flap F. The tubing engages the flap F as the carton C moves along the feed path into the activation zone. Coolant means 71, as generally represented in FIG. 4, circulates a suitable coolant, such as chilled water through the tubing 70. As such, it will be readily apparent that an active heat sink is provided to withdraw heat from the tubing 70 so as to prevent marring of the outside of the flap as the carton moves past it.

In addition, the coolant means 71 is operative to also pass cooling fluid through all of the major points where heat could be transferred by conduction to the conveyor 11. In this regard, as illustrated best in FIGS. 2, 2a and 3a, the tracks for supporting the upper and lower conveyor belts 15, 16 include circulating passages 75, 76, respectively. As a result, these tracks also provide an important heat sink for dissipation of the unwanted heat, thus further assuring an efficient heat sealing process, and specifically protection for the belts 15, 16.

Similarly, a first support bracket 77 has a circulating passageway through it to isolate the nozzle assembly 24 from the frame of the conveyor. In this manner, heat is further blocked along this path to the conveyor 11. A second support bracket 78 (see FIG. 2) also includes a passageway for circulation of cooling water from the coolant means 71 and return. Thus, any conduction of heat from the exhaust duct 35 to the conveyor 11 is prevented. In addition, the bracket 78 also supports the track for the upper conveyor belt 16 and thereby further isolates these components from heat that could soften and eventually damage the relatively soft polyurethane plastic.

As shown in FIG. 2, the bracket 78 includes a threaded nut portion 79 engaged with a jack screw 80, which in turn is driven through sprocket 81 and drive motor 82. When the carton feeding/sealing system 10 needs to be converted to a carton having a different depth or height, all that needs to be done is activation of the drive motor 82 until the proper height is reached (see movement arrow in FIG. 2). As is apparent, the confined space S for capturing the heated air, either after dispersal during adhesive activation, or as a compacted air stream between cartons (FIG. 3) or during bypass to avoid heating a stalled or slow carton C (FIG. 3a), is very efficient.

As an additional feature of the present invention, the nozzle assembly 24 should be highlighted, and especially as defined in the appended claims. The slotted outlet 32 of the nozzle body 30 in combination with the modified air foil shaped bar 60 is a substantial improvement over similar nozzles of the prior art, as can now be readily understood by those skilled in the art. The curved leading edge of the bar 60 is operative to deflect the heated air stream for high velocity impingement against the carton C/flap F to provide the desired adhesive activation compatible with the high speed carton feed. At the same time, during the times when the carton C is not positioned within the adhesive activation zone, the bar 60 is advantageously shaped so as to be operative to control and compact the heated air stream. The heated air in either instance can be more easily captured and disposed of without deleterious heating of the surrounding area, such as the conveyor 11. The specific shape, sizing of the slotted outlet 32 and positioning of the bar 60 to provide the optimum air space x (FIG. 2b) further adds to the inventiveness relating to the nozzle assembly 24 per se. Furthermore, the concept of the integral bypass duct 45 is a unique and very desirable feature. Not only is the duct 45 simultaneously opened (or closed) to receive (or cut-off) the heated air stream when the flow along the nozzle body 30 is to be interrupted (or restarted), but heat by conduction from the duct 45 keeps the nozzle body 30 relatively warm during bypass, thus cutting the time to reach the desired temperature equilibrium upon restart of the cartoning line. Because of the manner in which the nozzle body 30 curves through approximately 90° away from the conveyor 11, an additional advantage of avoiding excessive heat is gained.

In accordance with the method of feeding and heat sealing cartons in accordance with the present invention, the cartons C, $C_1$, $C_2$ are fed along the feed path of the conveyor 11 at a substantially constant speed. A supply of heated air is generated through operation of the pressure source 20 and the heater 22; the heated air stream is directed to impinge on the carton C through the operation of the nozzle assembly 24; and the dispersed heated air is captured in the confined space S (see FIG. 2a). Within the broad aspects of this method, the advantage of preventing the build up of excessive heat in the conveyor 11 is thereby obtainable.

As a further aspect of the method of the present invention, as well as a feature of the apparatus described above, a pair of photocells 85, 86 sense the movement of the carton C along the feed path at the same time as the cover of the carton is being plowed down in position by the plow P (see dashed line upstream carton C' in FIG. 4). Thus, in the preferred embodiment, as the carton C' moves on the belts 15, 16, the leading edge intercepts a light beam from light source 87 causing the photocell 85 to go dark indicating that the activation zone has been entered. A delay means 88 is connected between the photocell 85 and the microprocessor M. The delay for the particular carton C' is previously programmed into the microprocessor M through operation of an operator/machine interface I. The downstream photocell 86 is then intercepted by the carton C' and breaks the light beam from a second light source 89. The predetermined time for residence of the carton C' can thus be determined by the microprocessor M. That is, in the event that the photocell 86 does not go light before the time designated by the delay 88 times out, the predetermined time is exceeded and the microprocessor M calls for interruption of the heated air flow through the nozzle body 30 by actuation of the bypass valve stepper motor 47. Simultaneously, the heated air stream is bypassed around the carton C' through the bypass duct 45 and damage is avoided. As illustrated in FIG. 4, the microprocessor M also operates all the additional conveyor motors and other carton closer operating components.

In summary, it can be seen that a highly innovative carton feeding/sealing system 10 is provided by the apparatus and method concepts of the present invention. The exhaust duct 35 successfully captures and directs all of the unwanted heated air to the remote exit opening 53. A bypass valve and duct 40, 45 is operative to interrupt the flow of heated air in the event that the carton C' does not clear the activation zone in a programmed, predetermined time. The exhaust fan 50, provides positive pull of the heated air and entrainment of ambient air to further reduce the heat within and around the conveyor 11. The particular design of the bar 60 with a rounded leading edge and a tapered fin along the trailing edge forms a modified air foil that is highly effective in both modes of operation; that is, as a dam to deflect the stream for adhesive activation when a carton C is present, and also to control and compact the stream when no carton is present. Under either circumstance efficient capturing of the unwanted heated air is accomplished. Generating a vacuum within the confined space S and pulling at least six times the volume of the heated air stream from the nozzle assembly 24 further assures that excessive heating is avoided. Finally, the microprocessor M is functional to control all of the operating functions in a balanced manner.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated.

For example, instead of sensing or tracking a single carton C' through the photocells 85, 86 at a time and processing the signals in the microprocessor M just for that single carton C' a plurality or queue of cartons, such as $C_2$, $C_1$, C, C', can be tracked. In this case, the microprocessor M through preprogrammed instructions checks each carton in turn to make certain each passes through the activation zone within its predetermined time. All such modifications and variations are within the scope of the invention as determined by the appended claims when interpreted in accordance with breadth to which they are fairly, legally and equitably entitled.

We claim:

1. An apparatus for feeding and heat sealing cartons for closing with a flap, each carton having heat activated adhesive coating for sealing of the flap comprising:

a conveyor defining a substantially horizontal carton feed path;

means for generating heated air;

an elongated nozzle assembly positioned along one side of the feed path;

said nozzle assembly including a hollow nozzle body having an inlet mouth, and an elongated outlet extending along said feed path and directed toward the carton to form a heated air stream for activating said adhesive coating;

an elongated bar closely spaced above said slotted outlet;

the width of said bar being substantially the same as the space between the inside of said flap and said carton;

said bar having a modified air foil cross section with a curved leading edge and a tapered fin along the trailing edge;

hold down tubing for positioning said flap at an acute angle away from the side of the carton, said tubing extending substantially parallel to said bar and on the outside of said flap;

coolant means for passing fluid through said tubing to form an active heat sink and prevent marring of the outside of said flap;

upper and lower belts for moving said carton along the feed path;

track means for said belts;

a fluid passage within each of said track means;

said coolant means being connected to said passage to form an active heat sink and prevent overheating of said belts.

2. The apparatus for feeding/heat sealing of cartons as defined in claim 1, wherein is further provided a bypass valve along the length of said nozzle for interrupting the flow of heated air to the carton/flap, said bypass valve leading to a bypass duct with an outlet directed above said carton/flap;

an actuator for said bypass valve; and a controller for said actuator for opening said bypass duct to receive said heated air stream simultaneously with the interruption of the operation of the conveyor and to direct the heated air away from the carton/flap.

3. The apparatus for feeding/heat sealing cartons as defined in claim 2, wherein said hold down tubing is positioned between said nozzle body and said bypass duct.

4. The apparatus for feeding/heat sealing of cartons as defined in claim 3, wherein said bypass valve comprises a one-piece flapper valve within said nozzle body, said flapper valve extending at an acute angle into said heated air stream during activation of said adhesive to minimize disruption to said air stream, said flapper valve extending substantially across the full width of said nozzle to block the flow of said air stream when said actuator is operated.

5. An apparatus for feeding and heat sealing cartons for closing with a flap, each carton having heat activated adhesive coating for sealing of the flap comprising:

a conveyor defining a substantially horizontal carton feed path;

means for generating heated air;

an elongated nozzle assembly positioned along one side of the feed path;

said nozzle assembly including a hollow nozzle body having an inlet mouth, and an elongated outlet extending along said feed path and directed toward the carton to form a heated air stream for activating said adhesive coating;

an elongated bar closely spaced above said slotted outlet;

the width of said bar being substantially the same as the space between the inside of said flap and said carton;

said bar having a modified air foil cross section with a curved leading edge and a tapered fin along the trailing edge;

hold down tubing for positioning said flap at an acute angle away from the side of the carton, said tubing extending substantially parallel to said bar and on the outside of said flap;

coolant means for passing fluid through said tubing to form an active heat sink and prevent marring of the outside of said flap;

first and second brackets on said conveyor, each bracket including a fluid passageway, said first bracket for supporting said nozzle assembly and said second bracket for supporting an exhaust duct;

said coolant means being connected to said passageways to form an active heat sink and prevent overheating of said conveyor.

6. The apparatus for feeding/heat sealing of cartons as defined in claim 5, wherein is further provided a bypass valve along the length of said nozzle for interrupting the flow of heated air to the carton/flap, said bypass valve leading to a bypass duct with an outlet directed above said carton/flap;

an actuator for said bypass valve; and a controller for said actuator for opening said bypass duct to receive said heated air stream simultaneously with the interruption of the operation of the conveyor and to direct the heated air away from the carton/flap.

7. The apparatus for feeding/heat sealing of cartons as defined in claim 6, wherein said hold down tubing is positioned between said nozzle body and said bypass duct.

8. The apparatus for feeding/heat sealing of cartons as defined in claim 7, wherein said bypass valve comprises a one-piece flapper valve within said nozzle body, said flapper valve extending at an acute angle into said heated air stream during activation of said adhesive to minimize disruption to said air stream, said flapper valve extending substantially across the full width of said nozzle to block the flow of said air stream when said actuator is operated.

9. The apparatus for feeding/heat sealing of cartons as defined in claim 5, wherein is further provided means for adjusting the height of said exhaust duct and said upper belt, whereby cartons of different height can be accommodated for feeding/heat sealing.

10. An apparatus for feeding and heat sealing cartons for closing with a flap, each carton having heat activated adhesive coating for sealing of the flap comprising:

a conveyor defining a substantially horizontal carton feed path;

means for generating heated air;

an elongated nozzle assembly positioned along one side of the feed path;

said nozzle assembly including a hollow nozzle body having an inlet mouth, and an elongated outlet extending along said feed path and directed toward the carton to form a heated air stream for activating said adhesive coating;

upper and lower belts for moving said carton along the feed path;

track means for said belts;

a fluid passage within each of said track means; and coolant means connected to said passage to form an active heat sink and prevent overheating of said belts.

* * * * *